Patented Dec. 19, 1933

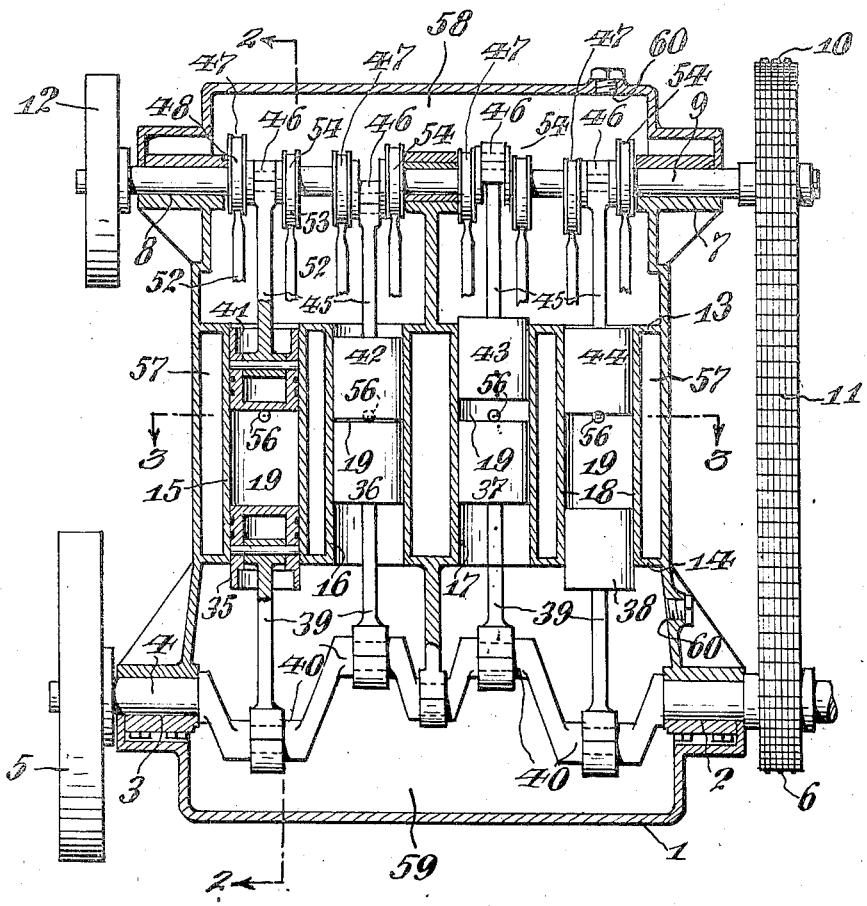

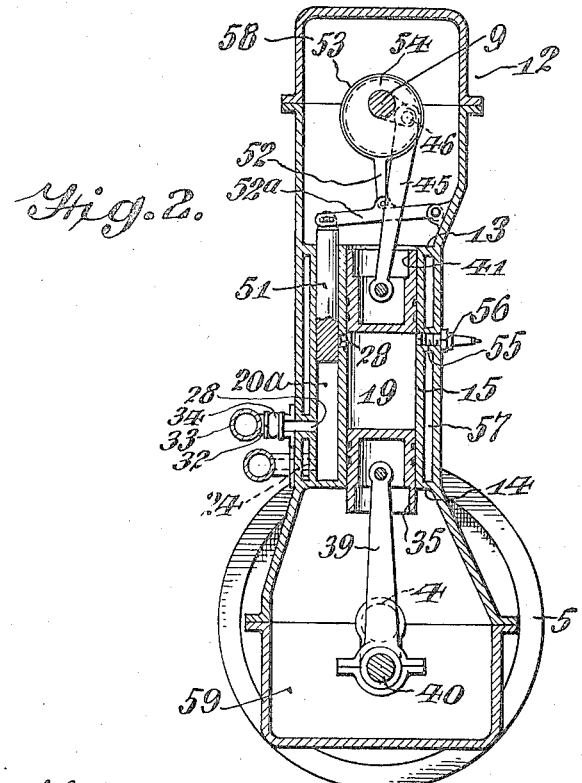
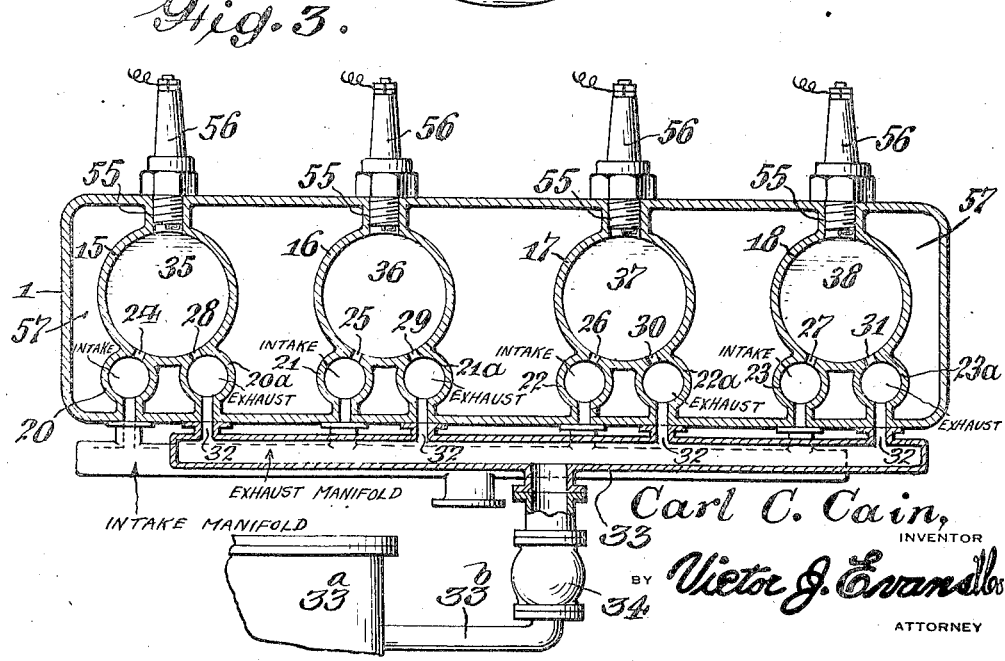

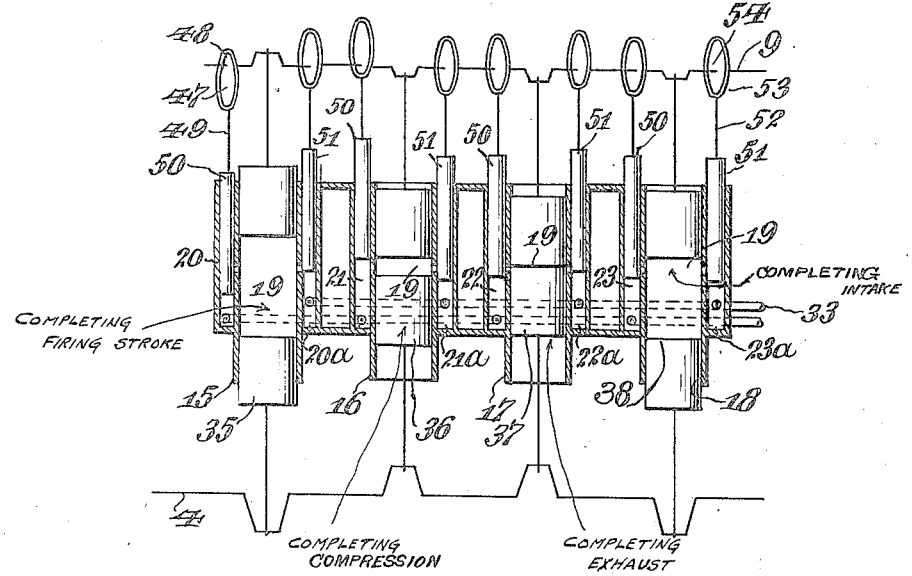

1,940,533

UNITED STATES PATENT OFFICE 1,940,533

INTERNAL COMBUSTION ENGINE

Carl C. Cain, Pleasantville, N. J.

Application July 11, 1932. Serial No. 621,995

5 Claims. (Cl. 123—51)

The present invention relates to an improved internal combustion engine of the four cycle type, and including drive and overhead or inverted pistons and intake and exhaust valves for controlling intake and exhaust parts, the intake and exhaust valves being connected to and timed in relation to the overhead or inverted pistons as to permit the intake valves to open at same time when the opposing pistons have started to separate sufficiently to provide combustion chambers for the reception of the charges, suction starting at once and at such time. Obviously during the suction, compression, and firing strokes the exhaust valves are in such positions as to keep the exhaust ports closed, but such exhaust valves are open during the entire exhaust strokes of the pistons, that is to say the lower or driving pistons. The construction of the internal combustion engine or motor being such that the utilized or exploded or exhaust gases can be compressed by forcing same into a storage tank, which may be connected to the exhaust manifold, such exhaust gases in the storage tank being under pressure can then be adapted for other and further uses. It is obvious that the compression taking place in the cylinders on the exhaust strokes of the pistons is just sufficient to overcome any resistance or back pressure already in the tank, although it is also obvious that connection between such storage tank and the exhaust manifold may include a check valve (not shown) to prevent back pressure or resistance.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:—

Figure 1 is a vertical sectional view through the improved internal combustion engine constructed in accordance with the invention.

Figure 2 is a vertical sectional view on line 2—2 of Figure 1.

Figure 3 is a transverse sectional view on lines 3—3 of Figure 1.

Figure 6 is a vertical sectional diagram view similar to Figures 4 and 5 showing other relative positions of the opposing overhead and drive pistons and intake and exhaust valves.

Figure 7 is a sectional diagram view similar to Figures 3, 4 and 5 disclosing still further relative positions of the opposing overhead and drive pistons, and intake and exhaust valves.

Figure 4:
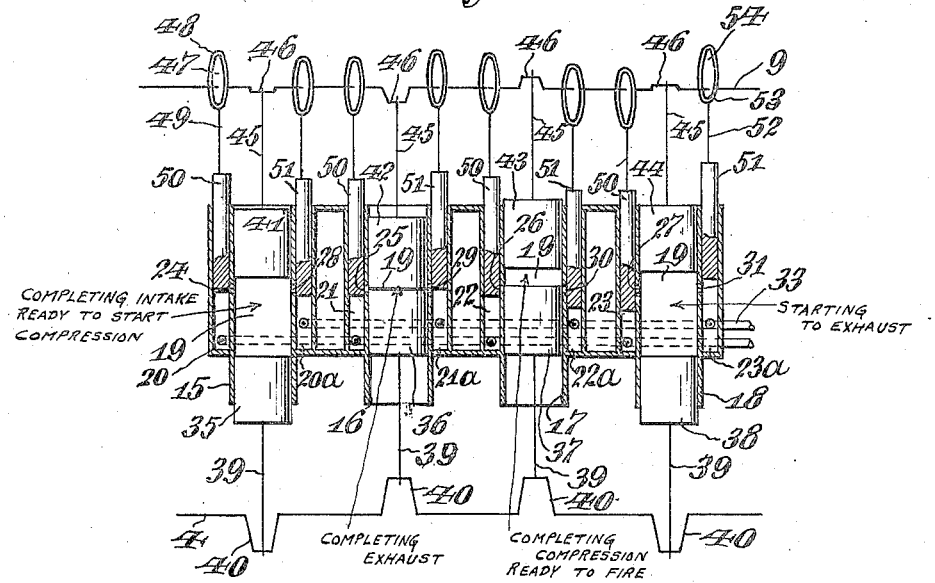
Figure 4 is a diagram showing the various overhead and drive opposing pistons and intake and exhaust valves, disclosing their various relative positions.

Referring to the drawings 1 identifies the engine casing, in suitable bearings 2 and 3 of which the drive crank shaft 4 is mounted. One end of the drive crank shaft 4 carries a pulley fly or balance wheel 5, while its other end carries a sprocket 6. Also in bearings 7 and 8 of the casing an eccentric carrying shaft 9 is mounted. One end of this shaft 9 carries a sprocket 10, which receives power from the sprocket 6 through the medium of a sprocket chain 11 which engages about the sprockets 6 and 10. The other end of the shaft 9 carries a pulley fly or balance wheel 12. It is obvious that the sprockets 6 and 10 can be any diameters such as will comply with the commercial trade. Preferably it is the aim to construct these sprockets 6 and 10 of such diameters that the eccentric carrying shaft may operate substantially one half as fast as the main crank shaft.

The engine casing 1 has walls 13 and 14 formed transversely of the casing, and connecting these walls are cylinder walls of the cylinders 15, 16, 17 and 18, and the central portions of these cylinders constituting combustion chambers 19. Integral with the walls of the cylinders 15 to 18 inclusive are valve cylinders 20 and 20a, 21 and 21a, 22 and 22a, 23 and 23a. The valve cylinders 20, 21, 22 and 23 constitute intake valve cylinders, while 20a, 21a, 22a, and 23a constitute exhaust valve cylinders. The intake valve cylinders 20, 21, 22 and 23 have intake ports of communication 24, 25, 26 and 27 with the cylinders 15 to 18 inclusive. The exhaust valve cylinders 20a, 21a, 22a, and 23a, have ports of communication 28 to 31 inclusive with the cylinders 15 to 18 inclusive. The exhaust valve cylinders have pipe connections 32 with an exhaust manifold 33, which in turn, by means of a pipe 33b, connects to a storage tank 33a for the reception of the compressed utilized or exploded gases to be used for other and further purposes. The pipe 33b has a check valve 34, which prevents any return flow of the compressed exploded gases.

Mounted in the cylinders 15 to 18 inclusive are drive pistons 35, 36, 37 and 38, which are connected by the usual links or connecting rods 39 to the several cranks 40, so that when the crank shaft 4 rotates the pistons reciprocate in the cylinders. The cranks of the crank shaft 9 operate on less radii than the cranks of the crank shaft 4, therefore the overhead pistons of the cylinders receive reciprocating movements of less distance than the lower drive pistons, in which case the overhead and lower pistons cooperate and are differently timed in order to expel entirely all of the exploded gases on the exhaust strokes, in order to put the exploded gases under pressure against resistance and force them into a storage element. Also mounted in the cylinders 15 to 18 inclusive are overhead opposing pistons 41, 42, 43 and 44, which are in turn connected by connecting rods 45 to the cranks 46 of the shaft 9.

The shaft 9 is provided with a plurality of eccentrics 47 which include eccentric straps 48 in turn connected by eccentric connecting rods 49 to intake valves 50, which operate in the intake valve cylinders 20, 21, 22 and 23, for controlling the intake ports 24, 25, 26 and 27. Mounted in the exhaust valve cylinders 20a, 21a, 22a and 23a are exhaust valves 51, for controlling the exhaust ports 28 to 31 inclusive. These exhaust valves have pivoted to their upper ends eccentric connecting rods 52 and link 52a, which in turn are connected to the eccentric straps 53, which operate around the eccentrics 54, also mounted upon the shaft 9.

The cylinders 15 to 18 have the usual spark plug receiving openings 55, in which the spark plugs 56 are threaded in the usual manner. The walls of the threaded spark plug receiving openings 55 are integral with one of the side walls of the engine casing. Due to the walls 13 and 14 dividing the engine casing so as to form a central compartment 57, which constitutes a water jacket for the cylinders 15 to 18 inclusive, the upper and lower parts of the engine casing are therefore divided off into chambers 58 and 59 constituting crank cases for the reception of oil for the cranks of the shafts 9 and 4 for keeping the cranks and their connections with the various pistons and valves properly lubricated. As these connections operate the oil is kept splashing thereon, therefore the crank cases have usual plug closed filling openings 60, through which the oil may enter the crank cases.

Figure 5:
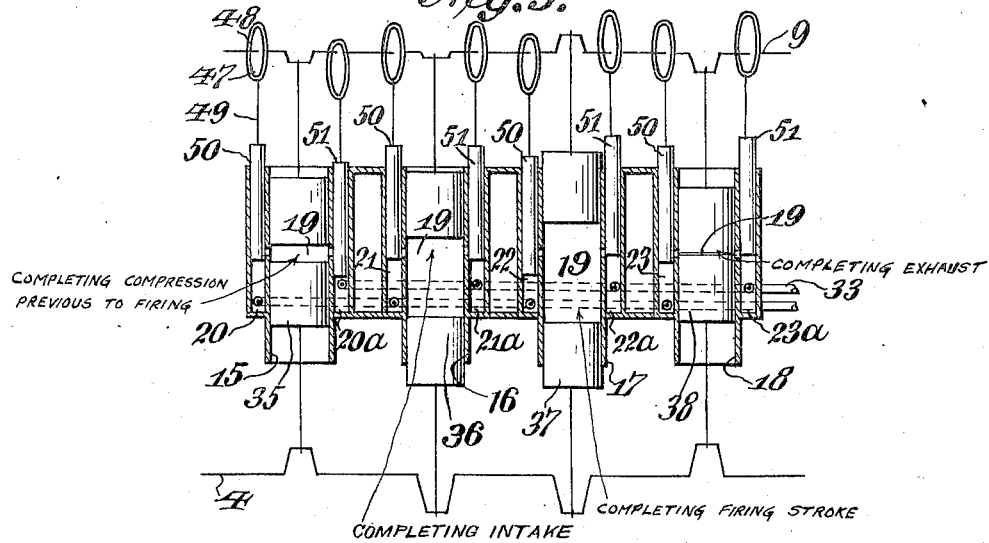
Figure 5 is a view similar to Figure 3 showing other relative positions of the overhead and drive opposing pistons and intake and exhaust valves.

By means of the diagrammatical views of Figures 3 to 6 inclusive, it is obvious that the several overhead and drive pistons and the several intake and exhaust valves are so connected and timed with relation to the cranks of the shafts 4 and 9 that the intake valves are retained closed on the compression, firing and exhaust strokes, and then on the exhaust strokes the exhaust valves open to permit escape of the exhaust gases. However the exhaust gases receive just sufficient compression by the lower pistons in order to overcome any resistance or back pressure in the storage tank, such utilized or exploded gases being retained in the storage tank under pressure and adapted to be used for other and further purposes. The overhead pistons 41, 42, 43 and 44 are so timed as to drive pistons 35, 36, 37 and 38, as to permit of combustion chambers at time of firing (at end of compression strokes of drive or lower pistons), and eliminate combustion chambers at the end of exhaust strokes. Thus on each exhaust stroke of each drive piston the respective cylinder is virtually transformed into a compressor.

Though this internal combustion engine or motor is used to compress the exhaust gases (such compression being sufficient to overcome the resitance or back presure in the storage tank), adapting the compressed exhaust gases for further use, the construction and arrangement of the engine or motor constitutes an improvement over the ordinary engine or motor. This construction and type of motor has further advantages because of the fact that the combustion chamber is eliminated on the exhaust strokes of the drive pistons, thereby forcing all the used or exploded gases from the cylinders, which permit entirely new charges of fuel to be drawn into the cylinders which results in considerably more power because the entirely new charges of fuel are not weakened by mixing with used gases remaining in the combustion chambers, as a result of the previous explosion, as in the case of the ordinary type of motor.

When using this type engine as an oil burning engine the spark plugs may be eliminated and suitable fuel injector valves (not shown) may be inserted.

The invention having been set forth, what is claimed is:

1. In an internal combustion engine of the four cycle type, a casing having a multiple of engine cylinders housed therein and a plurality of intake and exhaust valve cylinders likewise housed in the casing and provided with intake and exhaust port connections with the first cylinders, upper and lower crank shafts mounted in bearings of the casing, overhead and underhung pistons in the engine cylinders and provided with adjacent flat end faces with a combustion chamber therebetween, pitmen connecting the underhung pistons and the cranks of the lower shaft and connecting overhead pistons and the cranks of the upper shaft, the upper shaft having crank throws of less radii than the cranks of the lower shaft, the relative arrangement and timing of the cranks of both shafts being such as to insure expelling entirely all of the exploded gases on the exhaust strokes of the overhead and underhung pistons, thereby putting said exploded gases under pressure, intake and exhaust valves mounted in the valve cylinders for controlling the intake and exhaust ports, oscillating elements operatively balanced in the casing above the cylinders provided with pitmen having eccentric connections with the upper shaft for imparting movement to the oscillating elements, means connecting said elements and the intake and exhaust valves.

2. In an internal combustion engine of the four cycle type, a casing having a multiple of engine cylinders housed therein and a plurality of intake and exhaust valve cylinders likewise housed in the casing and provided with intake and exhaust port connections with the first cylinders, upper and lower crank shafts mounted in bearings of the casing, overhead and underhung pistons in the engine cylinders and provided with adjacent flat end faces with a combustion chamber therebetween, pitmen connecting the underhung pistons and the cranks of the lower shaft and connecting overhead pistons and the cranks of the upper shaft, the upper shaft having crank throws of less radii than the cranks of the lower shaft, the relative arrangement and timing of the cranks of both shafts being such as to insure expelling entirely all of the exploded gases on the exhaust strokes of the overhead and underhung pistons, thereby putting said exploded gases under pressure, intake and exhaust valves mounted in the valve cylinders for controlling the intake and exhaust ports, oscillating elements operatively balanced in the casing above the cylinders provided with pitmen having eccentric connections with the upper shaft for imparting movement to the oscillating elements, means connecting said elements and the intake and exhaust valves, the construction and relative arrangement of the connections between the overhead pistons and the eccentric connections between the upper crank shaft and the intake and exhaust valves being such and timed as to retain the intake valves closed on the compression, firing and exhaust strokes of the overhead and underhung pistons, and the intake valves open and the exhaust valves closed on the intake strokes of both sets of pistons.

3. In an internal four cycle combustion engine as set forth, a casing having a multiple of engine cylinders housed therein and a plurality of intake and exhaust valve cylinders likewise housed therein and provided with intake and exhaust ports connecting with the first cylinders, upper and lower crank shafts mounted in bearings of the casing, upper pistons and lower drive pistons in the engine cylinders and provided with adjacent flat end faces with a combustion chamber therebetween, connecting rods connecting the upper pistons and the cranks of the upper crank shaft, connecting rods connecting the lower drive pistons and the cranks of the lower shaft, said upper shaft having crank throws of less radii than the crank throws of the lower shaft and so timed as to impart reciprocating movements of less distance to the overhead pistons than the movements of the lower drive pistons and thereby bring both sets of pistons so close together on the exhaust strokes as to expel entirely all of the exploded gases and put such gases under pressure upon expulsion for storage against resistance, intake and exhaust valves mounted for reciprocating movements in the intake and exhaust valve cylinders for controlling the intake and exhaust ports, said upper crank shaft having eccentrics and connecting rods, and means connecting the rods of the eccentrics and said intake and exhaust valves, said connections between the upper crank shaft and the intake and exhaust valves being such and timed as to retain the intake valves closed on the compression, firing and exhaust strokes of both sets of pistons, and the intake valves open and the exhaust valves closed on the intake strokes of both sets of pistons.

4. In an internal four cycle combustion engine as set forth, a casing having a multiple of engine cylinders housed therein and a plurality of intake and exhaust valve cylinders likewise housed therein and provided with intake and exhaust ports connecting with the first cylinders, upper and lower crank shafts mounted in bearings of the casing, upper pistons and lower drive pistons in the engine cylinders and provided with adjacent flat end faces with a combustion chamber therebetween, connecting rods connecting the upper pistons and the cranks of the upper crank shaft, connecting rods connecting the lower drive pistons and the cranks of the lower shaft, said upper shaft having crank throws of less radii than the crank throws of the lower shaft and so timed as to impart reciprocating movements of less distance to the overhead pistons than the movements of the lower drive pistons and thereby bring both sets of pistons so close together on the exhaust strokes as to expel entirely all of the exploded gases and put such gases under pressure upon expulsion for storage against resistance, intake and exhaust valves mounted for reciprocating movements in the intake and exhaust valve cylinders for controlling the intake and exhaust ports, said upper crank shaft having eccentrics and connecting rods, and means connecting the rods of the eccentrics and said intake and exhaust valves, said connections between the upper crank shaft and the intake and exhaust valves being such and timed as to retain the intake valves closed on the compression, firing and exhaust strokes of both sets of pistons, and the intake valves open and the exhaust valves closed on the intake strokes of both sets of pistons, exhaust manifold connecting with the exhaust ports, and a controlled connection connected to the exhaust manifold for delivering the exploded gases under pressure into a storage element.

5. In an internal four cycle combustion engine as set forth, a casing having a multiple of engine cylinders housed therein and a plurality of intake and exhaust valve cylinders likewise housed therein, one of each for each engine cylinder provided with intake and exhaust ports with the engine cylinders, upper pistons and lower drive pistons in the engine cylinders with adjacent end flat faces with combustion chambers between the faces, piston valves in the valve cylinders for controlling the ports, upper and lower crank shafts in the casing, connecting rods between the upper and lower engine pistons and the cranks of the upper and lower crank shafts, the upper shaft having crank throws of less radii than the cranks of the lower shaft and so relatively timed with the lower crank shaft as to bring the flat end faces of the engine pistons at least a thousandths of an inch toward each other on the exhaust strokes to expel entirely all of the exploded gases, links pivoted for oscillating movement in the casing above the upper engine pistons and in turn having loose pivotal connections with the piston valves, eccentrics on the upper crank shaft, and connecting rods pivotally connected to said links and in turn having strap connections with said eccentrics.

CARL C. CAIN.